Patented Sept. 30, 1941

2,257,165

UNITED STATES PATENT OFFICE 2,257,165

AZO DYESTUFFS CONTAINING CHROMIUM IN COMPLEX UNION

Ernst Fellmer, Leverkusen-I. G.-Werk, Germany, assignor to General Aniline & Film Corporation, New York, N. Y., a corporation of Delaware No Drawing. Application March 16, 1940, Serial No. 324,377. In Germany November 25, 1933

4 Claims. (Cl. 260—145)

The present invention relates to new azodyestuffs containing chromium in complex union, more particularly it relates to chromium complex compounds of azodyestuffs, which may be represented by the following formula:

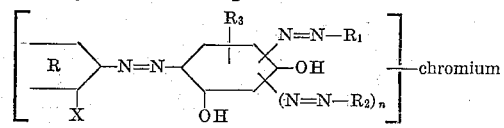

In this formula R stands for a radical of the naphthalene series, $R_1$ and $R_2$ stand for radicals of diazotization components suitable for producing azodyestuffs, $R_3$ stands for hydrogen, hydroxyl, alkyl, halogen, —COOH or —$SO_3H$, X stands for the hydroxy group or the carboxylic acid group, and $n$ stands for one of the values 1 and 0, the metal complex dyestuffs contain in the radicals R, $R_1$ and $R_2$ together at most one nitro-group per one chromium atom.

My new dyestuffs are obtainable by starting with a monoazodyestuff of the general formula:

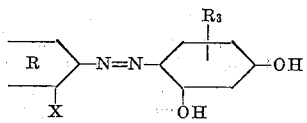

wherein X stands for hydroxyl, alkoxy or the carboxylic acid group R and $R_3$ means the same as above, coupling this monoazodyestuff with a diazo compound suitable for preparing azodyestuffs, if desired, coupling with a further diazo compound suitable for preparing azodyestuffs, and transforming the dyestuffs thus obtained into the chromium complex compounds of the corresponding o-hydroxy or o-carboxy azodyestuffs. This transformation into the chromium complex compounds may be performed according to known methods either in the final dyestuffs or in an intermediate stage of the dyestuff preparation either in an acid, neutral or an alkaline medium and, if necessary, under pressure. It is selfunderstood that if as starting compounds such azodyestuffs of the above identified second formula are used, in which X stands for alkoxy, the conditions of working must be chosen in such a way that the alkoxy group is split up in the manufacture of the chromium complex compounds. As agents yielding chromium may be used e. g. chromium sulfate, chromium acetate, chromium formate, chromium fluoride. By the variations possible in the formation of the chromium complex compounds, products may be obtained which differ somewhat in the shades or in the fastness to acid or to alkalies. In preparing the dyestuffs the components are chosen in such a way that the chromium complex compounds finally formed contain at most one nitro group per one chromium atom. In this way the intended shades are obtained.

The new chromium containing dyestuffs are in form of their alkali metal salts dark water-soluble powders which dye leather even grey to black shades of good fastness to light and washing; these shades may vary from a pure black to black shades showing certain tinges. The dyestuffs are in general suitable for dyeing the different kinds of leather such as chromium and vegetable tanned leather; they proved to be especially valuable for dyeing glacé leather yielding thereon fine black shades of excellent fastness to washing which is particularly important since this leather is used for making gloves.

This application is a continuation-in-part of my copending application Ser. No. 193,854, filed 4th March, 1938 now patent No. 2,200,445, issued May 19, 1940.

The invention is illustrated by the following examples without being restricted thereto, the parts being by weight:

Example 1

The sodium hydroxide alkaline solution prepared from 11 parts of 1.3-dihydroxybenzene is coupled with the diazo compound prepared from 28.4 parts of 6-nitro-1-amino-2-hydroxynaphthalene-4-sulfonic acid. The monoazodyestuff salted out and isolated is then coupled in sodium hydroxide alkaline, concentrate solution with the diazo compound prepared from 14.3 parts of 4-chloro-2-amino-1-hydroxybenzene and, when the coupling is complete, salted out and separated. In order to transform the dyestuff into the double metal complex compound it is boiled for several hours with an aqueous chromium sulfate solution acid to litmus corresponding to 18.7 parts of $Cr_2O_3$, made alkaline and clarified and finally isolated in the usual manner. The dyestuff which corresponds in its free state, i. e. in the form of the free acid, to the following formula:

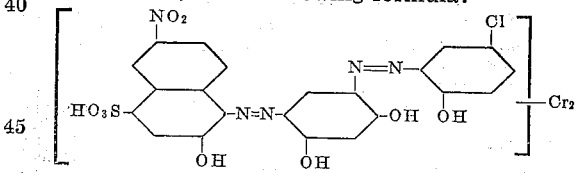

dyes leather grey to black shades.

Example 2

The diazo compound prepared from 28.4 parts of 6-nitro-1-amino-2-naphthol-4-sulfonic acid is coupled in an alkaline medium with 11 parts of resorcinol, and the monoazodyestuff is isolated by acidifying the solution and adding salt. The dyestuff is then transformed into its chromium complex compound by refluxing for several hours with aqueous chromium sulfate solution corresponding to 10 parts of $Cr_2O_3$. The chromium lake is then coupled in a soda-alkaline medium with the diazo compound prepared from 22.3 parts of naphthionic acid and isolated from acid medium. The dyestuff having in its free state, i. e. in the form of the free acid, the following formula:

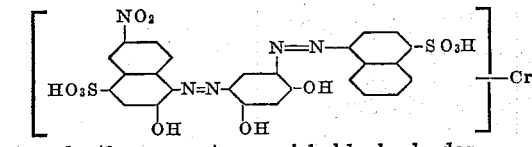

dyes leather grey to greyish-black shades.

*Example 3*

The diazo compound prepared from 23.9 parts of 1-amino-2-naphthol-4-sulfonic acid is coupled in sodium hydroxide alkaline solution with 11 parts of resorcinol, and the monoazodyestuff is isolated by acidifying the solution and adding salt. This monoazodyestuff is stirred into water and is coupled in the presence of caustic soda lye with the diazo compound prepared from 15.4 parts of 4-nitro-2-aminophenol. The disazodyestuff obtained is salted out from acid medium, filtered off and—in order to convert it into the double chromium complex compound—boiled for several hours with reflux or heated in the autoclave to 110° C. with an aqueous chromium sulfate solution corresponding to 16.5 parts of $Cr_2O_3$ at weakly acid reaction, then made alkaline and clarified still hot and finally isolated and dried in the usual manner. The dyestuff corresponds in the free state, i. e. in the form of the free acid, to the following formula:

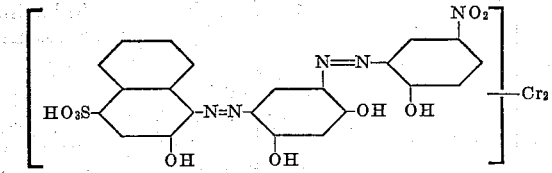

It dyes leather grey to black shades.

Further examples illustrating the invention are stated in the following table:

In the preparation of the dyestuffs 6, 7, 8, 10 and 16 of the above table the formation of the chromium complex compound has taken place after the first coupling.

I claim:

1. Azodyestuffs containing chromium in complex union of the general formula:

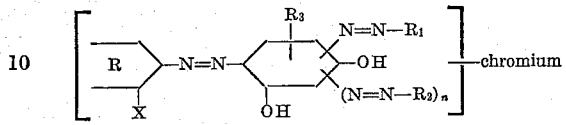

wherein R stands for a radical of the naphthalene series, $R_1$ and $R_2$ stand for radicals of diazotization compounds suitable for producing azodyestuffs, $R_3$ stands for a member of the group consisting of hydrogen, hydroxyl, alkyl, halogen, —COOH and —$SO_3H$, $x$ stands for a member of the group consisting of the hydroxy and the carboxylic acid group, and $n$ stands for one of the values 1 and 0, which metal complex dyestuffs contain in the radicals R, $R_1$ and $R_2$ together at most one nitro-group per one chromium atom, being in the form of their alkali metal salts dark watersoluble powders dyeing leather fast grey to black shades.

2. Azodyestuffs containing chromium in complex union of the general formula:

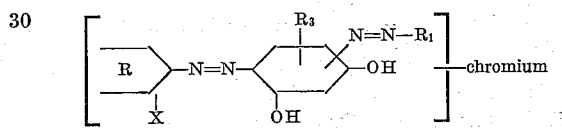

wherein R stands for a radical of the naphthalene series, $R_1$ stands for a radical of a diazotization component suitable for producing azodyestuffs, $R_3$ stands for a member of the group consisting of hydrogen, hydroxyl, alkyl, halogen, —COOH and —$SO_3H$, and X stands for a member of the group consisting of the hydroxy and the carboxylic acid group, which metal complex

| Diazo component bearing the lake-forming group (R) | Azo component | First diazo component ($R_1$) | Second diazo component ($R_2$) | Metal | Shades on glacé leather |
|---|---|---|---|---|---|
| 1.2-aminonaphthol-4-sulfonic acid. | Resorcinol | 4-chloro-2-aminophenol | | Chromium twice | Bluish black. |
| Do | do | 4-chloro-2-aminophenol-6-sulfonic acid. | | do | Blue-black. |
| Do | do | 4-nitro-2-aminophenol-6-sulfonic acid. | | do | Slightly greenish black. |
| Do | do | 4.6-dinitro-2-aminophenol. | | do | Black. |
| Do | do | m-chloraniline | | Chromium | Violettish black. |
| Do | do | Dehydrothiotoluidine sulfonic acid (obtained by sulfonation) | | do | Greenish black. |
| Do | do | p-nitraniline. | | do | Black. |
| Do | do | Aminoazobenzene sulfonic acid. | | do | Do. |
| 6-nitro-1.2-aminonaphthol-4-sulfonic acid. | do | p-chloraniline | | do | Brownish black. |
| Do | do | 2-naphthylamine-6-sulfonic acid. | | do | Black. |
| Do | do | 4-aminodiphenylamine sulfonic acid. | | do | Olivish black. |
| Do | do | 4-aminodiphenylether-2-sulfonic acid. | | do | Do. |
| Do | do | 4-chloro-2-aminophenol. | 2-nitraniline-4-sulfonic acid. | Chromium twice. | Greenish black. |
| Do | do | 4-nitro-2-aminophenol | | do | Do. |
| Do | do | 5-nitro-2-aminophenol | | do | Violettish black. |
| 1.2-aminonaphthol-4-sulfonic acid. | do | 4-nitro-1,3-diaminobenzene. | | Chromium | Black. |
| Do | do | 5-nitro-2-aminophenol | | Chromium twice | Bluish black. |
| Do | do | do | 2-toluidine-5-sulfonic acid. | do | Black. |
| Do | do | | do | do | Black-blue. |
| Do | do | 4-chloro-2-aminophenol-5-sulfonic acid. | do | do | Bluish black. |
| Do | do | 6-chloro-2-aminophenol-4-sulfonic acid. | do | do | Do. |
| Do | do | 2-aminophenol-4-sulfamide. | | do | Do. |
| Do | 1.3.5-trihydroxybenzene | 4-chloro-2-aminophenol | | do | Blue-black. |
| 6-nitro-1.2-aminonaphthol-4-sulfonic acid. | do | Anthranilic acid | | do | Violettish black. | dyestuffs contain in the radicals R and R₁ together at most one nitro-group per one chromium atom, being in form of their alkali metal salts dark watersoluble powders dyeing leather fast grey to black shades.

3. The azodyestuffs containing chromium in complex union, in the form of its free acid, of the formula:

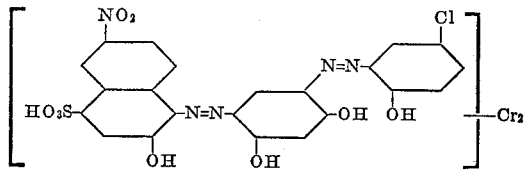

dyeing leather grey to black shades.

4. The azodyestuff containing chromium in complex union, in the form of its free acid, of the formula:

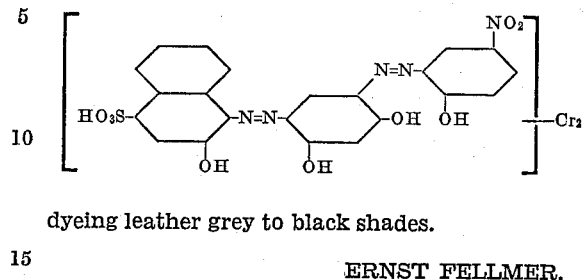

dyeing leather grey to black shades.

ERNST FELLMER.